United States Patent

[11] 3,602,193

| [72] | Inventors | John R. Adams<br>Sutherlin;<br>Willis W. Hill, Lebanon, both of, Oreg. |
|---|---|---|
| [21] | Appl. No. | 815,173 |
| [22] | Filed | Apr. 10, 1969 |
| [45] | Patented | Aug. 31, 1971 |
| [73] | Assignee | said Adams, by said Hill |

[54] APPARATUS FOR PREPARING COATINGS WITH EXTRUSIONS
7 Claims, 6 Drawing Figs.

[52] U.S. Cl. ................................................. 118/315, 118/324
[51] Int. Cl. .................................................. B05c 5/00
[50] Field of Search ....................................... 118/315, 324, 2, 300.6, 602, 6; 198/20 T, 31 A3

[56] References Cited
UNITED STATES PATENTS

| 2,724,486 | 11/1955 | Hatch et al. | 198/20 X (T) |
| 3,080,043 | 3/1963 | Johansen et al. | 198/31 (A3) X |
| 3,155,540 | 11/1964 | Loeffler et al. | 118/375 X |
| 3,303,816 | 2/1967 | Lauring | 118/300.6 |
| 3,318,725 | 5/1967 | Bryan | 118/315 X |
| 3,451,374 | 6/1969 | Clausen et al. | 118/602 X |

Primary Examiner—John P. McIntosh
Attorney—Kolisch & Hartwell

ABSTRACT: Method and means for preparing adhesive coatings. A bank of extrusion devices forms extrusions of adhesive that fall to form smooth-flowing filament streams of adhesive that make flowing contact with the face of the object being coated. A striped pattern of adhesive is produced which is converted into a substantially continuous glue line with the application of heat and pressure. A veneer-handling conveyor line for producing plywood panels, where veneer pieces travel on a conveyor and thence are directed either through an adhesive-application station or a course which bypasses such station. The veneer pieces are reassembled downstream from such station to form a traveling series of veneer pieces comprising veneer pieces with adhesive coatings interspersed with veneer pieces free of adhesive. The veneer pieces are then stacked in the order that they appear in said traveling series to complete the layup of plywood panels.

PATENTED AUG 31 1971 3,602,193

INVENTORS
JOHN R. ADAMS
WILLIS W. HILL
BY
Kolisch & Hartwell
ATTORNEYS

APPARATUS FOR PREPARING COATINGS WITH EXTRUSIONS

This invention relates to extrusion apparatus, and the preparation of coatings using such apparatus. Exemplary of such coatings are adhesive coatings applied to veneer pieces as a step in the manufacture of plywood panels. Included within the invention are a novel extrusion apparatus for the extrusion of materials, a novel conveyor line for veneer pieces facilitating the layup of plywood panels including such extrusion apparatus, a novel method of preparing a coating, and a novel method of applying adhesive to veneer pieces and for the handling of veneer pieces when laying up plywood panels were the application of adhesive is a step in the process.

Explaining how plywood has typically been prepared in the past, and considering specifically the manufacture of three-ply plywood panels, it has been usual to have the veneer pieces which form the face and back of a panel, referred to commonly as faces or backs, in separate piles, and to stack such veneer pieces on a layup table with the sandwiching of core pieces between successive faces and backs. Immediately prior to panel layup, the core pieces conventionally are passed through a glue coater having rolls that apply coatings of adhesive to opposite faces, and these adhesive coatings form the final glue lines bonding the core to the plies on opposite sides. The labor cost in carrying out a procedure as just outlined is relatively high, and the amount of plywood which can be laid up in an eight-hour shift is limited. As a consequence, attempts have been made to devise other systems which would speed up panel layup and require less manpower.

In the development of the instant invention, it has been determined that the means and method employed for applying adhesive to the face of a veneer piece is an important factor in developing a system for laying up plywood panels which is truly efficient and which can be carried out with reasonable space requirements and without extensive material-handling equipment. In the course of these investigations, it has also been discovered that if a particular means and method is employed for the application of adhesive, much greater control over adhesive spreads than previously experienced is possible, and more uniform products are obtainable. The cost of preparing adhesive spreads may be reduced, and other advantages are also realized.

Further amplifying on the above, when a roll coater is employed for preparing adhesive coatings, and if such is done over both faces of a core piece, problems are introduced in handling the core piece after the coatings have been applied. Furthermore, the usual roll coater is a relatively massive piece of equipment, and it has not been practical to incorporate such in a conveyor line with provision made for the bypassing of selected pieces around the roll coater. This has required the provision in automated equipment of separate conveyor lines for handling the different types of veneer found in plywood, and necessitated the provision of means for assembling the material carried on such lines in a layup station. Because of the inherent roughness found in the faces of veneer pieces, and for other reasons, the coatings applied by a roll coater must have a certain minimum thickness in order for uniform coverage to be obtained.

Other procedures employed for applying an adhesive coating utilize sprayers for spraying adhesive. When an adhesive is sprayed, there are limitations with respect to the type of adhesive that may be utilized and the speed with which veneer can be conveyed past the sprayers. There are also problems in selecting a sprayer that will properly reduce adhesive to spray form, with such operating reliably. So-called curtain coaters, and coaters that deluge a sheet with adhesive with any excess being wiped off, require special adhesive formulations to operate properly, are difficult to control to obtain uniform results (particularly if the coating is thin), and have the disadvantage of being relatively messy.

One general object of the invention is to provide novel extrusion apparatus for extruding materials, whereby a coating may be prepared from such materials.

Another object is to provide a novel means and method for applying adhesive to the face of an article, such as a veneer piece, which takes care of many of the above-indicated problems in a highly practical and satisfactory manner.

More specifically, an object of the invention is to provide apparatus for applying material as a coating, featuring a bank of extruders producing multiple extrusions which, under the action of gravity, form smooth-flowing filament streams making flowing contact with the article being coated. In the manufacture of plywood, these flowing streams produce a striped pattern of adhesive on the face of a veneer piece, which pattern converts to a continuous glue line in the completed plywood panel.

Yet another object of the invention is to provide extrusion apparatus including a bank of extruders which functions in a reliable manner to produce downwardly directed extrusions of consistent size. The extruders in the apparatus may be positioned to produce very closely spaced streams of flowing material, with these streams remaining separate from each other and falling in prescribed courses which are subject to little deviation. As a result, stripes of material may be formed on the article being coated which are regularly spaced from each other and have uniform size.

In this connection, and in the context of applying an adhesive, it is contemplated that the material receiving the adhesive, i.e., veneer pieces in a panel layup system, be moved at a uniform speed under the bank of extruders, with the speed of the veneer pieces substantially equaling the falling speed of the streams of adhesive immediately prior to their making flowing contact with the veneer pieces. With this procedure, each stream, in effect, lays down on a veneer piece face without being distorted, and optimum consistency is obtained in the adhesive coating.

With adhesive applied as contemplated, it has been found that each filament stream is subject to slight oxidation whereby a protective film or shell forms about its exterior. The adhesive within such shell or film tends to remain more active, whereby at press time, maximum glue line efficiency is obtained. This, together with the better distribution of adhesive possible with the apparatus, and the control permitted over the amount of spread, permits reductions to be made in a glue spread with the production of final glue lines conforming to requisite standards.

As a further feature, and in connection with the manufacture of plywood, the invention contemplates a veneer-handling conveyor line where all the veneer which is to make up plywood panels, including core pieces, faces, and backs (and centers with five or more ply panels) initially travels along a common conveyor. This material is then processed by directing all the veneer pieces but the veneer pieces forming the tops of panels through a course including an application station where adhesive is applied with extrusion apparatus as described to the top faces of the veneer pieces. The veneer pieces forming the tops of panels bypass the adhesive-application station. At a point downstream from the adhesive-application station, the veneer pieces are reassembled on a common conveyor, with the pieces having an adhesive distribution thereon interspersed with those free of adhesive. At a layup table these various pieces are taken in the order at which they arrive at the table, and stacked one over the other to produce by such stacking assemblies of veneer ready for pressing into panels. A relatively compact layup line can be produced with the system outlined, which is flexible, in that it may readily be converted to produce three-ply panels, or panels having a greater number of plies. The operation is relatively simple, and can be performed with a minimum number of men.

Other features and objects of the invention will become more fully apparent as the following description is read in conjunction with the accompanying drawings, wherein.

Since certain features of the invention pertain to plywood manufacture, the invention will be described in detail in connection with the manufacture of plywood panels. By so doing, however, it is not intended to exempt from the invention those features that have applicability in other types of manufacture and processing.

Figure 1:
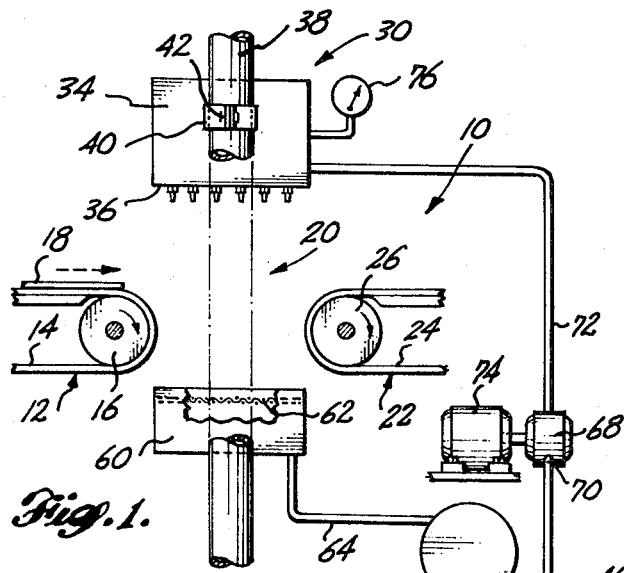
FIG. 1 is a side elevation showing portions of a veneer-handling conveyor line, illustrating adhesive-extrusion apparatus in the line, and also showing, in somewhat diagrammatic form, a pump and related components used in circulating adhesive through the extrusion apparatus.

Referring now to the drawings, and first of all more particularly to FIG. 1, portions of a veneer-handling conveyor line usable to prepare veneer pieces for plywood panel layup are illustrated at 10. Such includes a conveyor section 12, which conventionally may comprise multiple endless belts, such as belt 14, trained over pulleys, such as the one shown at 16. A suitable drive for the conveyor section is provided (not shown), and with movement of the belts, veneer pieces, as represented by the veneer piece 18, are transported from left to right into an adhesive-application station, designated generally at 20.

Spaced slightly in advance of conveyor section 12, and aligned with the conveyor section, is another conveyor section 22. Section 22 includes belts, such as belt 24, trained over pulleys, such as pulley 26. Means (not shown) is also provided for moving the belts of this conveyor section at the same speed as belts 14, whereby the conveyor section is operable to transport veneer pieces out of application station 20. The two conveyor sections together constitute a conveyor for transporting veneer pieces along a path where such path extends through application station 20.

The material applied to the face of a veneer piece, i.e., adhesive in the manufacture of plywood, is applied by forming multiple extrusions of the flowable material and permitting such to fall under the action of gravity to produce smooth-flowing streams which make flowing contact with the face in application station 20. The extrusion apparatus which produces such extrusions is depicted in the drawings at 30.

Further describing extrusion apparatus 30, such comprises an elongated box or extruder tank 34 which extends transversely of the path of travel defined by conveyor sections 12 and 22. The end only of this box or tank is shown in FIG. 1, but it should be understood that the tank extends from such end to an opposite end disposed adjacent the opposite side of the conveyor line from the one illustrated. The tank is closed over its top. The tank may be mounted in any suitable manner, with its bottom 36 spaced some distance above the plane of conveyor sections 12 and 22. In the particular embodiment of the invention illustrated, each end of the tank is supported on a fixed standard, such as the one shown in fragments at 38, through a clamp, such as the one shown at 40, which is tightened about the standard by nut and bolt assembly 42. The construction described permits some vertical adjustment to be made in the position of the tank, after first loosening the clamps at either end.

Figure 2:
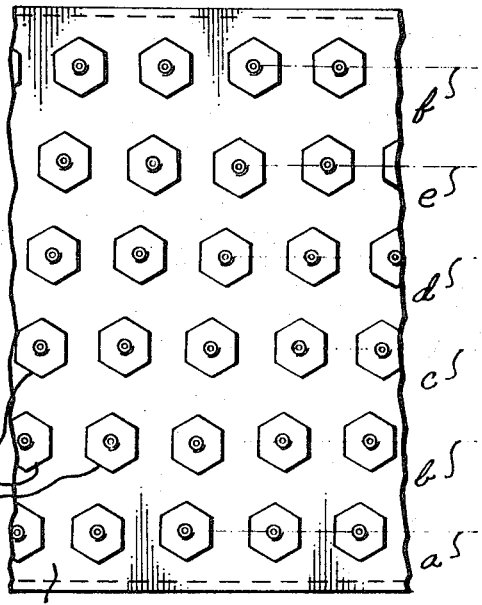
FIG. 2 is a view, on an enlarged scale, illustrating portions of a bank of extrusion devices provided for the extrusion apparatus.
Figure 3:
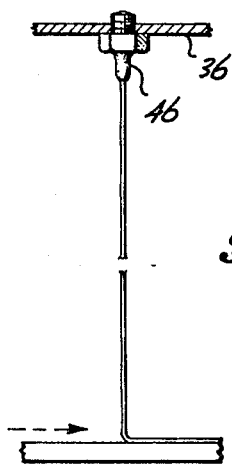
FIG. 3 illustrates an extrusion device, showing how it functions to extrude adhesive with an extrusion under the action of gravity forming a filament stream of adhesive making flowing contact with a veneer piece face.
Figure 4:
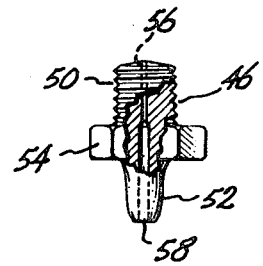
FIG. 4 is a view, on a somewhat larger scale than FIG. 3, showing an extrusion device with portions broken away, to reveal passages therein for metering and extruding adhesive.

Referring now more particularly to FIGS. 2, 3 and 4, mounted on the bottom of tank 34 is a bank of fittings 46, also referred to herein as extrusion devices. As best illustrated in FIG. 2, which is a view looking upwardly at the bottom of a portion of the tank, the extrusion devices are disposed in parallel rows $a$ through $f$ extending along the length of the tank bottom, with six of such rows being illustrated in the particular embodiment shown. The extrusion devices of one row are staggered slightly with respect to the extrusion devices in the rows to either side of it. The distribution of the devices shown in FIG. 2 results in a lateral spacing, in a direction extending transversely of the path of travel of the veneer, or from left to right in FIG. 2, of the centers of such devices at regular modules. Typically, this lateral spacing is selected to be within the range of one-sixth to one-twelth of an inch. By the provision of multiple rows with devices staggered in each row, the devices are offset from each other in directions longitudinally and transversely of the path of the veneer, which permits the close lateral spacing of the centers to be achieved.

Referring now more particularly to FIG. 4, which shows an extrusion device on a slightly larger scale, each device includes a threaded stem or stem portion 50, a nipple or extruder portion 52, and an integrally formed nut between the ends of the fitting, shown at 54. A pair of communicating passages or bores are provided within the fitting, comprising a metering passage in the stem, shown at 56, and an extrusion passage (or opening) shown at 58.

In a specific form of the invention, and in the handling of the usual plywood adhesive, a metering passage of three sixty-fourths inch diameter was provided in conjunction with an extrusion passage of one-sixteenth inch diameter. Generally, it is preferred that the cross-sectional area of the metering passage be from 30 to 60 percent of the cross-sectional area of the extrusion passage.

The threaded stem is employed in screwing the fitting into place, and the nut is utilized in performing this mounting. The metering passage meters the amount of adhesive flowing through the fitting from the tank where the adhesive is stored under pressure. If the adhesive were to be discharged directly into the atmosphere on leaving the metering passage, under certain circumstances, the adhesive would be thrown out as a jet stream, which would destroy the type of flow desired in the adhesive on leaving the extrusion device. The extrusion opening, therefore, functions to collect adhesive passing from the metering passage and to form an extrusion of such adhesive at a substantially reduced pressure. With the construction described, the adhesive forms an extrusion directed downwardly from the tip of the nipple, and under the action of gravity, this extrusion forms into a smooth-flowing filament stream, as perhaps best shown in FIG. 3, which illustrates a fitting and the stream flow that results therefrom.

The exterior of the nipple tapers progressing toward the end through which passage 58 communicates with the atmosphere. This eliminates any ledge around the outside of the extrusion opening where material could collect. The top of the stem is also slightly tapered, as seen in FIG. 4, which discourages any sediment that collects on the base of tank 34 from entering the metering passage.

With the distribution of fittings shown in FIG. 2, and by reason of the stream flow produced, when a veneer piece passes under the extrusion apparatus on traveling through the application station, the streams of adhesive dropping from the extrusion apparatus form a striped pattern of adhesive on the face of the veneer piece with the spacing between adjacent stripes equaling approximately the lateral spacing between the centers of the extrusion devices. In the manufacture of plywood, it has been found preferable to produce an adhesive spread containing from six to 12 stripes per inch. With an adhesive spread applied as indicated, and with as little as 13 pounds of adhesive applied per 1,000 square feet of veneer surface, a substantially continuous glue line is producible in the final plywood panel.

Continuing with the description of the apparatus, and referring again to FIG. 1, a tray is shown at 60 which collects any adhesive flowing past conveyor sections 12, 22. Ordinarily the extrusion apparatus is operated continuously, and in those intervals when a veneer piece is not passing under the flow paths of the adhesive, the adhesive continues to fall and collect in the tray. A screen may be provided, such as that shown at 62, for screening out foreign particles which may collect in the adhesive during the circulation of the adhesive.

Describing now the equipment provided for circulating the adhesive, a conduit 64 leaves tray 60 and connects with a reservoir 66. A gear-type pump, shown at 68, has its intake 70 connected to the reservoir. With operation of the pump, adhesive is discharged through conduit 72 into box or tank 34. A motor 74 drives the pump, such being of a variable speed type. By increasing the speed with which the pump is driven, the speed of the pump is increased, and a greater flow of adhesive into tank 34 results. This produces an increase in the rate of extrusion occurring through the various extrusion devices. The pump and motor constitute a variable drive pumping unit. Shown at 76 is a gauge indicating the pressure of adhesive within box or tank 34. Ordinarily, and considering plywood manufacture, pressures of from 5 to 30 pounds p.s.i.g. will be noted during the extrusion of an adhesive.

Figure 5:
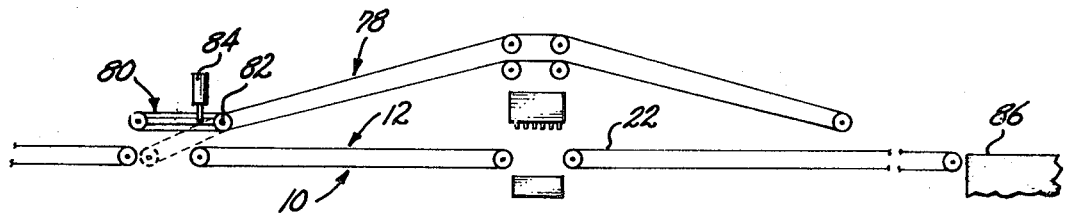
FIG. 5 is a somewhat simplified view, on a reduced scale, showing the entire veneer-handling conveyor line, and means provided in the line for diverting selected veneer pieces along a course which bypasses the adhesive-application station.

In FIG. 5, the veneer-handling conveyor line is shown in its entirety, in somewhat simplified form and drawn to a smaller scale than the scale used in FIG. 1. It will be noted that the line includes, in addition to conveyor sections 12 and 22, a conveyor section 78 which generally overlies the other conveyor sections and which also passes over box or tank 34 of the extrusion apparatus. Conveyor section 78 is power driven, and may comprise endless belts trained over pulleys similar to the belts and pulleys described for sections 12 and 22.

Adjacent the infeed end of conveyor section 78 is a tipple conveyor 80. Such is swingably mounted at 82 for up and down swinging of its forward end. Power-operated means such as the ram shown at 84 is actuated to shift the tipple conveyor from the lowered position shown in solid outline to the raised position shown in dashed outline. The belts of the tipple conveyor are offset from the belts of conveyor section 12, enabling the feed end of the tipple conveyor to be lowered down below the plane of conveyor section 12.

The offbearing end of conveyor 78 terminates short of the end of conveyor section 22. In this way, veneer pieces transported along conveyor section 78 on coming to the offbearing end of the conveyor section are deposited on conveyor section 22 disposed under it. Portions of a plywood layup table are shown at 86, directly adjacent the offbearing end of conveyor section 22.

With the veneer-handling conveyor line shown in FIG. 5, plywood panels may be prepared from a series of veneer pieces deposited on the infeed end of conveyor section 12, and with such series of pieces including backs, cores, and faces, distributed so that with stacking of successive pieces on top of each other the pieces are in proper order to produce plywood panels. Further explaining, and considering the manufacture of a three-ply panel, the material carried from the infeed end of conveyor section 12 would comprise a back (or face) followed by a core, followed by a face (or back), with this order of pieces being repeated along the conveyor section. On such material approaching the feed end of the tipple conveyor, the tipple conveyor is raised to permit the passage of a back and a core under it without diversion. With the approach of a face, the tipple conveyor is lowered whereby the face is directed up onto conveyor section 78. The back and core on passing through the adhesive-application station have adhesive distributed over their top faces, and the face bypasses the adhesive-application station. Downstream from the adhesive-application station, the pieces are reassembled in their original order on conveyor section 22 to produce a series of pieces comprising backs and cores with adhesive applied to their top faces interspersed with face pieces free of adhesive. The veneer pieces on arriving at the layup table may be stacked one on top of the other to produce three-ply assemblies with adhesive deposits between back and core and core and face, suitable for the production (with the application of heat and pressure) of the usual three-ply panel.

Obviously, the procedure just outlined is easily altered to enable the production of a five-ply panel, or panels of a greater number of plies. With a five-ply panel, for instance, the order of the veneer pieces fed into conveyor section 12 may comprise a back, followed by a core, followed by a center, followed by a core, followed by a face. All but the face veneer is directed without diversion through the adhesive-application station, whereas the face is diverted up over the extrusion apparatus by actuation of the tipple conveyor.

Figure 6:
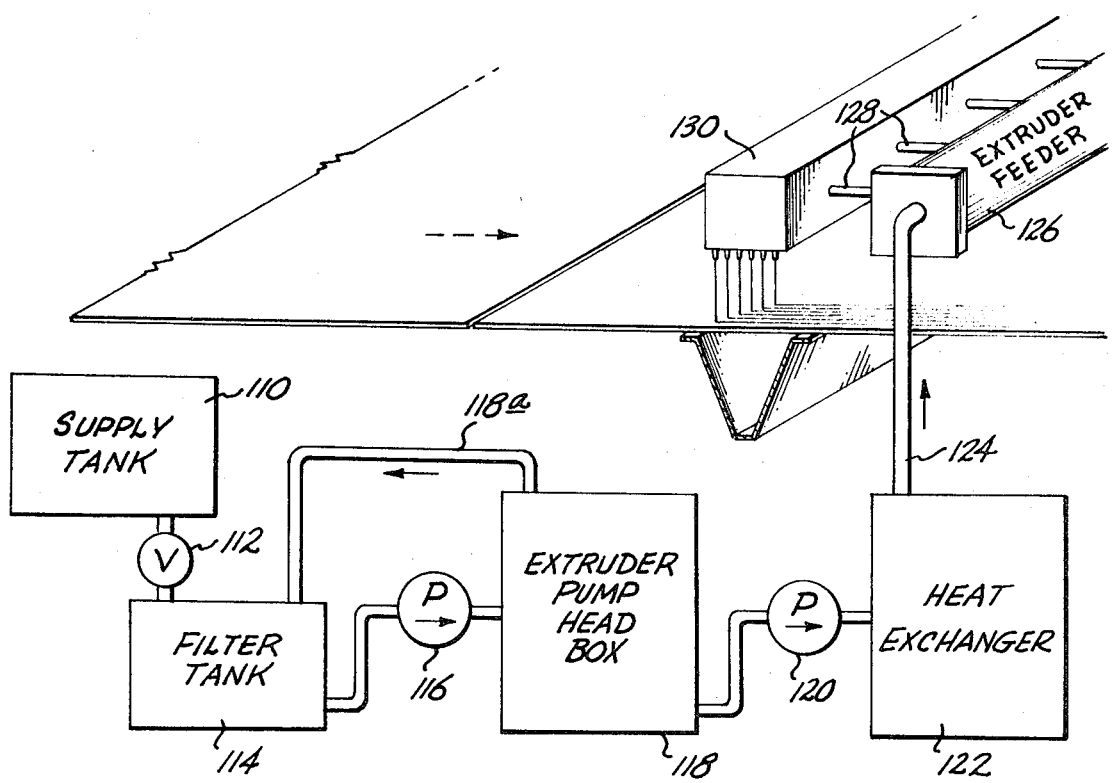
FIG. 6 shows another form of circulating system for circulating material through the extrusion apparatus of the invention.

FIG. 6 illustrates another form of circulating system for circulating liquid material which is extruded. Utilizing the equipment shown in FIG. 6, more exact control over the spreads produced is possible. The equipment shown in FIG. 6 is particularly designed for applications where climatic or other conditions are subject to some variation, which would have the effect of altering the viscosity of the material handled.

Referring to FIG. 6, shown at 110 is a supply tank which is filled with liquid material, i.e., the adhesive to be extruded in the case of plywood manufacture. A conduit including a valve 112 supplies adhesive from tank 110 to a so-called filter tank 114. The filter tank includes filters (not shown) which filter the material circulated through the tank. A level sensor, also not shown, provided within the filter tank senses the level of adhesive within the tank and automatically adjusts the valve 112 to replenish adhesive within the filter tank when the level drops below a certain minimum.

Shown at 116 is a variable drive pumping unit with the intake thereof connected to the filter tank and discharging into an extruder pump head box, shown at 118. An overflow 118a is provided for the extruder pump head box, and the filter pump is run at such a speed as to cause a small recycling of adhesive through the overflow which assures a substantially constant level of material in the head box.

A variable drive pumping unit 120, which is the pumping unit which delivers material to the extruder, has its intake connected to head box 118. The discharge from the pumping unit is connected to a heat exchanger 122. In the heat exchanger the temperature of the material to be extruded may be raised to a certain predetermined level, for instance, 90° F. as is typical in manufacturing plywood. The temperature level of the adhesive maintained in the supply tank might be near room temperature or 70° F. Ordinarily, a plywood adhesive should have a somewhat lower viscosity than the viscosity it has at room temperature, for best application, which dictates a raising of its temperature in the heat exchanger, although in some applications it may be preferable to raise the viscosity or lower the temperature of the material to be extruded in the heat exchanger.

Pumps are somewhat sensitive to changes on their intake or suction side. By providing a pumping unit 116 upstream from pumping unit 120, and with the overflow return described for head box 118, it is possible to obtain a substantially uniform pressure of the material on the suction side of pumping unit 120.

Material is conducted from the heat exchanger through a conduit 124 to what is referred to as an extruder feeder, shown at 126. The extruder feeder has a relatively large cross section, and by reason of this and during operation of the equipment, there is a relatively small and insignificant pressure drop in the liquid material between the ends of the extruder feeder.

The extruder feeder is connected by feeder conduits 128 to the extruder box, or tank, 130 corresponding to tank 34 pictured in FIG. 1. With this arrangement, the pressure of fluid introduced into the extruder tank and during operation of the equipment is substantially uniform throughout all base regions of the tank.

During running of the equipment, whether it be of the type illustrated in FIG. 1 or FIG. 6, it is usual to control the spread produced by the extruder apparatus by properly controlling the variable drive pumping unit or units involved in the circulating equipment, and by noting the volume of material pumped, such being substantially directly related to the speed at which these are operated. If the volume of the liquid material pumped into the extruder box or tank is maintained constant, the volume of material extruded will remain substantially constant, irrespective of slight viscosity changes which may occur in the material. Volume rather than pressure, therefore, is a more stable value to base the control of the flow of the material being spread.

The following specific examples further illustrate the invention.

A conventional plywood type adhesive was prepared from a phenol-aldehyde resin, an extender (Glufil), industrial grade wheat flour, sodium hydroxide, and sodium carbonate. The phenolic resin was an alkaline water solution of a pheno-formaldehyde condensate having a nonvolatile content of 41 percent, a specific gravity of 1.185 to 1.195, a pH ranging from 11.5 to 12.0, and a viscosity at 77° F. of T-V (Gardiner-Holt).

The extender Glufil is a proprietary product of Agrashell, Inc. of California, and comprises principally finely ground walnut shells.

In preparing the adhesive, 330 pounds of water and 20 gallons (187 pounds) of resin were introduced into a mixing vessel and mixed for about one-half minute. One hundred fifty pounds of extender and 45 pounds of wheat flour were then introduced to the vessel and the contents mixed for an additional 3 minutes. At this time, 46 pounds of a 50 percent caustic solution were added, and after mixing for 1 minute, 12 pounds soda ash were added, followed by a mixing for 15 minutes. Finally, an additional 73 gallons (683 pounds) of resin were added to the vessel, and the product mixed for another 5 minutes. The adhesive produced had a viscosity of 2,900 c.p.s. at 77° F., when measured with a Brookfield viscosimeter.

An adhesive so prepared was introduced into equipment of the type illustrated in FIGS. 1 through 5, and using an adhesive circulating system of the type illustrated in FIG. 6. The extruder tank was adjusted so that the bottoms of the extruders on the base of the tank were elevated approximately three inches above the top faces of veneer traveling under the tank.

Three-ply plywood panels were prepared with the conveying of backs and cores through the application station at a speed of about 200 feet per minute. Face pieces were diverted around the application station. The pumping volume of the variable drive pumping unit feeding the extruder tank was adjusted to produce a spread on those veneer pieces passing through the application station of about 20 pounds per 1,000 square feet.

Veneer pieces coming to the layup table were stacked one on top of the other, to form three-ply plywood assemblies. These were subsequently subjected to the usual press cycle, with heat applied to produce finished panels. When samples from these panels were torn apart, substantially continuous glue lines were found to exist between adjacent plies in a panel.

With the adhesive described, it was found that the filament streams of adhesive produced in the extruder apparatus made flowing contact with the veneer pieces being spread, with the flow speed of these adhesive streams approximately equaling the travel speed of the veneer through the application station. With more viscous adhesives, which evidence a greater stringing characteristic, a greater distance of fall is required for the filament streams if their speed of falling is to match the rate of veneer travel on coming into contact with the veneer. A greater distance of fall is easily accomplished by raising the extruder tank on the standards which mount it.

In another operation, an adhesive was employed comprising an unextended alkaline aqueous solution of a pheno-formaldehyde resin, i.e. a "neat" resin. The pheno-formaldehyde resin was prepared using the procedure outlined in example 1 of U.S. Pat. No. 2,889,241, with the exception that no sodium tetraborate was added to the adhesive. The adhesive was utilized in the production of three-ply plywood panels, as described in the first example set forth, with the volume of adhesive pumped being adjusted to produce a spread of 13 pounds per 1,000 square feet of glue line. Plywood panels were produced having substantially continuous glue lines between the plies thereof.

As already noted, the volume of material pumped is controlled to control the extrusion rate and the thickness of the spread produced. The spread may further be controlled by controlling the speed at which the articles receiving the spread pass through the application station. Preferably, the speed of the articles receiving the spread approximate, within 50 percent, the speed of the flowing streams of material as they make flowing contact with such articles. This produces minimum distortion of the streams upon their lying down on the faces of the articles. With faster travel of the articles receiving the spread, the speed of the flowing streams of material may be increased by raising the tank whereby the streams fall farther before making contact with the articles.

Because of the very close control permitted over the amount of material which makes up a spread, and the fact that the spread is prepared not by transfer from one surface to another, but through streams making flowing contact, it has been found that relatively light spreads may be prepared with such having a consistent distribution over the articles receiving the spread. In the case of plywood manufacture, it has been found that relatively light spreads will result in substantially continuous glue lines in the final product where the spreads are prepared from closely spaced filament streams as described above.

With a plywood adhesive, some oxidation occurs on the outer surfaces of the filament streams of adhesive. These serve to maintain the adhesive inside in an active state, whereby optimum bonds are ultimately attainable.

With the metering devices illustrated, there is minimal tendency for material to build up on the tip of the nipples, thus to effect the flow rate and the direction of extrusion. As a consequence, the apparatus may be continuously operated for a long period of time with uniform flows produced through such time period, and with such regularly distributed across the path of travel of the articles being covered.

While various embodiments of the invention have been described, obviously changes and variations are possible which would suggest themselves to those skilled in the art.

It is claimed and desired to secure by Letters Patent:

1. Apparatus for processing veneer to produce a distribution of adhesive thereon comprising
a tank for holding a supply of adhesive,
a bank of extrusion devices mounted on the base of said tank through which adhesive within the tank is extruded,
each extrusion device including a nipple projecting below the base of the tank, and passage means extending through the device including an extrusion passage at the base of the device opening to the atmosphere and a metering passage of lesser cross-sectional area than the extrusion passage located between the extrusion passage and the interior of the tank, and
a veneer conveyor defining a path of travel for veneer pieces which path extends under said bank of extrusion devices, said extrusion devices being spaced laterally of each other extending transversely of said path.

2. The apparatus of claim 1, wherein said bank of devices includes multiple rows of devices extending transversely of said path, the devices of one row being staggered with respect to the devices of another row.

3. The apparatus of claim 1, wherein each extrusion device comprises a body removably mounted on the base of said tank, said nipple forming the bottom end of said body and the body including a threaded stem joining with said nipple forming the top end of the body, said passage means extending through the stem and said nipple.

4. The apparatus of claim 3, wherein said stem has a top face bounding the top thereof which has a convex taper.

5. The apparatus of claim 4, wherein an extrusion device is mounted on the base of the tank with its said top face projecting above said base.

6. The apparatus of claim 1 which further comprises another veneer conveyor defining another path of travel for veneer pieces, said other path extending generally in the same direction but being vertically spaced from said first-mentioned path and constituting a bypass of said first-mentioned path, and means for directing veneer pieces selectively either to said first-mentioned or to said other conveyor.

7. The apparatus of claim 6, wherein a conveyor feeds the means for directing veneer pieces, and said other conveyor deposits pieces on said first-mentioned conveyor at its discharge end.